UNITED STATES PATENT OFFICE.

FRITZ ROTHE, OF DESSAU, ANHALT, GERMANY.

METHOD OF PRODUCING AMMONIA AND COMPOUNDS OF AMMONIA.

1,083,703.     Specification of Letters Patent.     Patented Jan. 6, 1914.

No Drawing.     Application filed February 27, 1911. Serial No. 611,226.

*To all whom it may concern:*

Be it known that I, Dr. FRITZ ROTHE, a subject of the King of Prussia, residing at Albrechtstrasse 116, Dessau, Anhalt, Germany, have invented certain new and useful Improvements in Methods of Producing Ammonia and Compounds of Ammonia, of which the following is a specification.

It is well known that mixtures of hydrogen with oxids of nitrogen, for example nitric oxid or nitric peroxid, are converted into ammonia in the presence of spongy platinum or similarly acting contact-substances, in accordance with the following equation:

$$2NO + 5H_2 = 2NH_3 + 2H_2O$$

or $$N_2O_4 + 7H_2 = 2NH_3 + 4H_2O$$

According to statements to be found in the literature of the art the catalytic substances similar in effect to spongy platinum are zinc-oxid, stannic acid, copper-oxid, ferric oxid or their metals, and porous bodies. These catalytic surfaces, when inserted within a tube and raised to a bright red heat are said to produce an ample amount of ammonia from a mixture of hydrogen and oxids of nitrogen passed over them. Practical tests of these statements have proven, however, the said method to be incapable of furnishing a technically satisfying output of ammonia. This discovery is verified by other indications contained in the literature. For example Graham Otto says in his work "*Lehrbuch der Chemie*," Vth edition, II, 2, page 80: "The quantity of the ammonia formed in this manner cannot be considerable, since ammonia is decomposed at a bright red heat." In the same passage the formation of ample ammonia is mentioned only in connection with the employment of platinum sponge. Further it is stated by Varentrapp and Will in "*Ann.*," volume 39, page 294: "Not all of the nitrogen is converted into ammonia." Further in Gemelin-Kraut's "*Anorg. Chemie*," VIIth edition, volume I, 1, page 200, the following sentence is found: "Furthermore, disturbances occur by reason of the explosion-like progress of the reduction." Moreover when we take into consideration the fact, that ammonia at a bright red heat is decomposed by metals (*vide* Gemelin-Kraut's "*Handbuch der Anorg. Chemie*", VIIth edition, page 214 above) it will be evident that no quantitative output of ammonia can be obtained in this manner, since the very metals or alloys which accelerate the change to ammonia, also act strongly to dissociate the ammonia. An endeavor has been made to improve this procedure by employing spongy platinum at a temperature below 80° C., and, in the case in question, with the aid of static electric discharges.

I have discovered, that contrary to expectation a theoretical or nearly theoretical output of ammonia can be obtained from the oxids of nitrogen employed, if the catalytic metals are not so to speak concentrated, for example like platinum-sponge, but are strongly diluted on porous carriers, such as asbestos, and are employed for example in the shape of asbestos containing from one to five per cent. of platinum, or from one to ten per cent. of copper or nickel at higher temperatures.

Contact-substances consisting of non-porous material completely coated with platinum or the like are as unsuitable as pure metals. Therefore the surface of non-porous carriers should be only partly coated with a catalytic metal in order to obtain a good output by the said reaction. It is more or less immaterial, whether the catalytic metal be applied in a very finely divided state, as only the small quantity of the catalytic metal in proportion to the weight of porous materials and in proportion to the surface of non-porous carriers is essential. My invention, therefore, comprises this reduction of the amount of the catalytic metal in proportion to the carrier, whereby the said unexpected effect of the method is obtained.

The quantitative output depends upon a certain high temperature, which should not be altered, but varies with the catalytic metal employed and its proportion to the carrier.

I have found, that the various metals are different in effective strength, and that it is advantageous to employ a smaller percentage at a higher temperature of the strongly acting metals, such as platinum, in order to obtain regularity of operation of the process and a good output. Of more weakly acting catalytic metals, such as copper, nickel, iron, a larger percentage may be employed at a lower temperature, in order to obtain the same effect. For example, asbestos containing five per cent. of platinum employed at a temperature of from 575° to 600° centigrade has been found to act like asbestos containing ten per cent. of copper in the reduction of nitric peroxid and to furnish from 98 to 99% of the theoretical quantity of ammonia. For a lower percentage of the same metal or for a more weakly acting contact-substance the temperature employed must be raised. For example, a contact-substance with one per cent. of platinum furnished during the passage of nitric oxid 100% of the theoretical output of ammonia at the temperature of 650° centigrade. The same output is obtained with four per cent. of copper or nickel at a medium red-heat, that is at the temperature of 750° centigrade. Thus under these circumstances, in contradistinction over what hitherto was known, no decomposition of the ammonia takes place even at a red-heat.

It could not be foreseen, that in the presence of metals a substance so easily decomposable as ammonia could under the mentioned conditions still withstand temperatures as high as 750° centigrade without noticeable dissociation. This is the more remarkable, inasmuch as to exceed by 20 to 30° C. the limit referred to produces such heavy losses as to render a technically sufficient output impossible.

The limit for the required dilution of the catalytic metals or alloys varies with their kind. While for example asbestos containing ten per cent. of copper makes possible an output of from 97 to 98% of ammonia, a contact-substance containing ten per cent. of platinum was found to make possible an output of only 90%. In general, about 10% of catalytic material in the contact mass is the limit for obtaining technically acceptable outputs. Also for the employment of mixtures of hydrogen with other gases, such as for example water-gas, the indicated reduction in quantity of catalytic substances has been found to be advantageous. In such case the carbon monoxid during its conversion into carbonic acid partakes in the reduction of the oxids of nitrogen, which are quantitatively turned into ammonia. The formation of a volatile combination from nitric peroxid and carbonic oxid, which ordinarily so easily takes place (vide Gemelin-Kraut, VIIth edition, I, 1, pages 283 to 285) is avoided under the conditions stated.

The method is carried into effect by conducting a mixture of gaseous compounds of nitrogen and oxygen with hydrogen or with gases containing hydrogen and carbonic oxid or other reducing gases, such as carbohydrogen and the like, over a contact-mass contained in a vessel capable of being heated at temperatures varying with the kind of the contact-mass between 350° and 750° centigrade.

As the ammonia formed can be partly decomposed by pure metals or alloys, it is advisable to carry on the described method not in metallic apparatus but in vessels made from indifferent material, such as chamotte-porcelain and the like, or in metallic vessels internally lined with these materials.

I claim:

1. The method of producing ammonia or combinations of ammonia, which comprises conducting a gaseous mixture containing hydrogen together with compounds of nitrogen and oxygen, at a high temperature, over a contact mass containing a percentage of a catalytic substance not materially exceeding 10%; substantially as described.

2. The method of producing ammonia or combinations of ammonia, which comprises conducting a gaseous mixture containing hydrogen, together with compounds of nitrogen and oxygen, at a high temperature, over a contact mass containing a percentage of a catalytic substance within the range of from 1% to not materially more than 10%; substantially as described.

3. The method of producing ammonia or combinations of ammonia, which comprises conducting a gaseous mixture containing hydrogen, in the form or carbureted hydrogen, together with compounds of nitrogen and oxygen, at a high temperature over a contact mass containing a percentage of a catalytic substance within the range of from 1% to not materially more than 10%; substantially as described.

4. The method of producing ammonia or combinations of ammonia, which comprises conducting a gaseous mixture containing hydrogen, carbon monoxid, together with compounds of nitrogen and oxygen, at a high temperature, over a contact mass containing so small a percentage of a catalytic substance as to avoid the formation of a volatile combination from nitric peroxid and carbon monoxid which would otherwise take place; substantially as described.

In witness whereof, I have hereunto set my hand this 16 day of February 1911.

Dr. FRITZ ROTHE.

Witnesses:
  MAX HAMBURGER,
  WERNER SIEBERT.